United States Patent
Gough

[11] Patent Number: 5,956,298
[45] Date of Patent: Sep. 21, 1999

[54] VOICE PROMPTING AND INDEXING DICTATION RECORDER

[76] Inventor: Jesse Lynn Gough, 39 Ashington La., Brentwood, Tenn. 37027

[21] Appl. No.: 08/967,792

[22] Filed: Nov. 10, 1997

[51] Int. Cl.[6] .................................................. H04M 11/10
[52] U.S. Cl. ............................................ 369/29; 369/25
[58] Field of Search ................................ 369/29, 25, 27, 369/28, 26; 360/96.3, 96.4, 72.2, 72.1, 72.3, 61, 60, 79

[56] References Cited

U.S. PATENT DOCUMENTS

| | | | |
|---|---|---|---|
| 3,760,124 | 9/1973 | Gaven | 360/79 |
| 3,827,079 | 7/1974 | Bolick | 360/79 |
| 3,869,720 | 3/1975 | Ohira | 360/72.1 |
| 3,881,072 | 4/1975 | Becker | 369/128 |
| 3,936,805 | 2/1976 | Bringol et al. | 395/873 |
| 3,965,484 | 6/1976 | Matz et al. | 360/61 |
| 3,972,071 | 7/1976 | Arrington | 360/86 |
| 4,000,518 | 12/1976 | Sterns | 360/74.4 |
| 4,007,491 | 2/1977 | Bolick | 360/74.4 |
| 4,024,354 | 5/1977 | Bolick et al. | 360/69 |
| 4,041,249 | 8/1977 | Matz et al. | 369/126 |
| 4,051,540 | 9/1977 | Wilder et al. | 360/72.3 |
| 4,179,714 | 12/1979 | Kobayashi | 360/61 |
| 4,200,893 | 4/1980 | Matison | 360/72.1 |
| 4,221,938 | 9/1980 | Mohammadioun et al. | 369/29 |
| 4,224,644 | 9/1980 | Lewis et al. | 360/72.2 |
| 4,227,222 | 10/1980 | Sato | 360/60 |
| 4,319,337 | 3/1982 | Sander et al. | 345/331 |
| 4,343,039 | 8/1982 | Smith | 369/28 |
| 4,352,173 | 9/1982 | Titus | 369/27 |
| 4,392,218 | 7/1983 | Plunkett | 369/29 |
| 4,398,279 | 8/1983 | Titus et al. | 369/58 |
| 4,399,527 | 8/1983 | Titus et al. | 369/28 |
| 4,410,923 | 10/1983 | Patel | 360/137 |
| 4,422,114 | 12/1983 | Sugihara | 360/96.4 |
| 4,468,751 | 8/1984 | Plunkett | 360/55 |
| 4,488,274 | 12/1984 | Plunkett | 369/24 |
| 4,794,474 | 12/1988 | Dwyer et al. | 360/72.2 |
| 4,812,940 | 3/1989 | Takenaga | 360/137 |
| 4,858,213 | 8/1989 | Dwyer et al. | 369/28 |
| 4,955,051 | 9/1990 | Sato | 379/75 |
| 4,975,894 | 12/1990 | Jachmann et al. | 369/25 |
| 5,008,871 | 4/1991 | Howells et al. | 369/28 |
| 5,163,085 | 11/1992 | Sweet et al. | 379/88.19 |
| 5,179,627 | 1/1993 | Sweet et al. | 704/200 |
| 5,197,052 | 3/1993 | Schroder et al. | 369/25 |
| 5,235,571 | 8/1993 | Ellermeier | 369/25 |
| 5,319,620 | 6/1994 | Hohenbuchler et al. | 369/29 |
| 5,398,220 | 3/1995 | Barker | 369/25 |
| 5,491,774 | 2/1996 | Norris et al. | 704/270 |
| 5,548,566 | 8/1996 | Barker | 369/25 |

*Primary Examiner*—Ali Neyzari

[57] ABSTRACT

A method for improving dictation recorders and systems by providing a means to separately and independently record and store and, during any later dictation recording session, separately retrieve and audibly replay multiple dictation-indexing voice-prompt dictation cues, and thus by their successive replaying enable a dictator to be audibly prompted and thereby aided while dictating in conformance with a corresponding list, outline, instruction set, or standard form represented by said voice-prompt dictation cues.

7 Claims, 11 Drawing Sheets

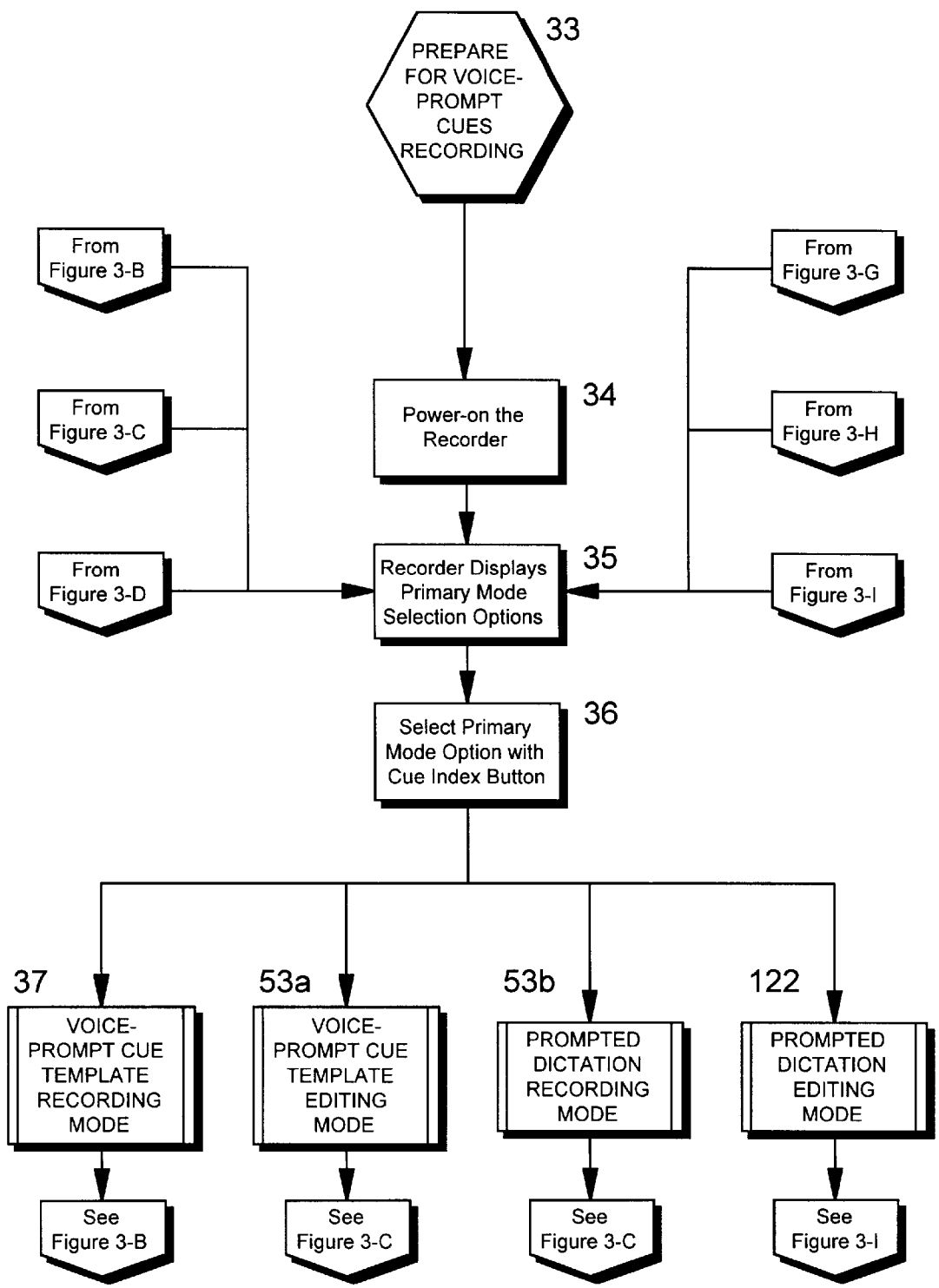
Figure 3-A

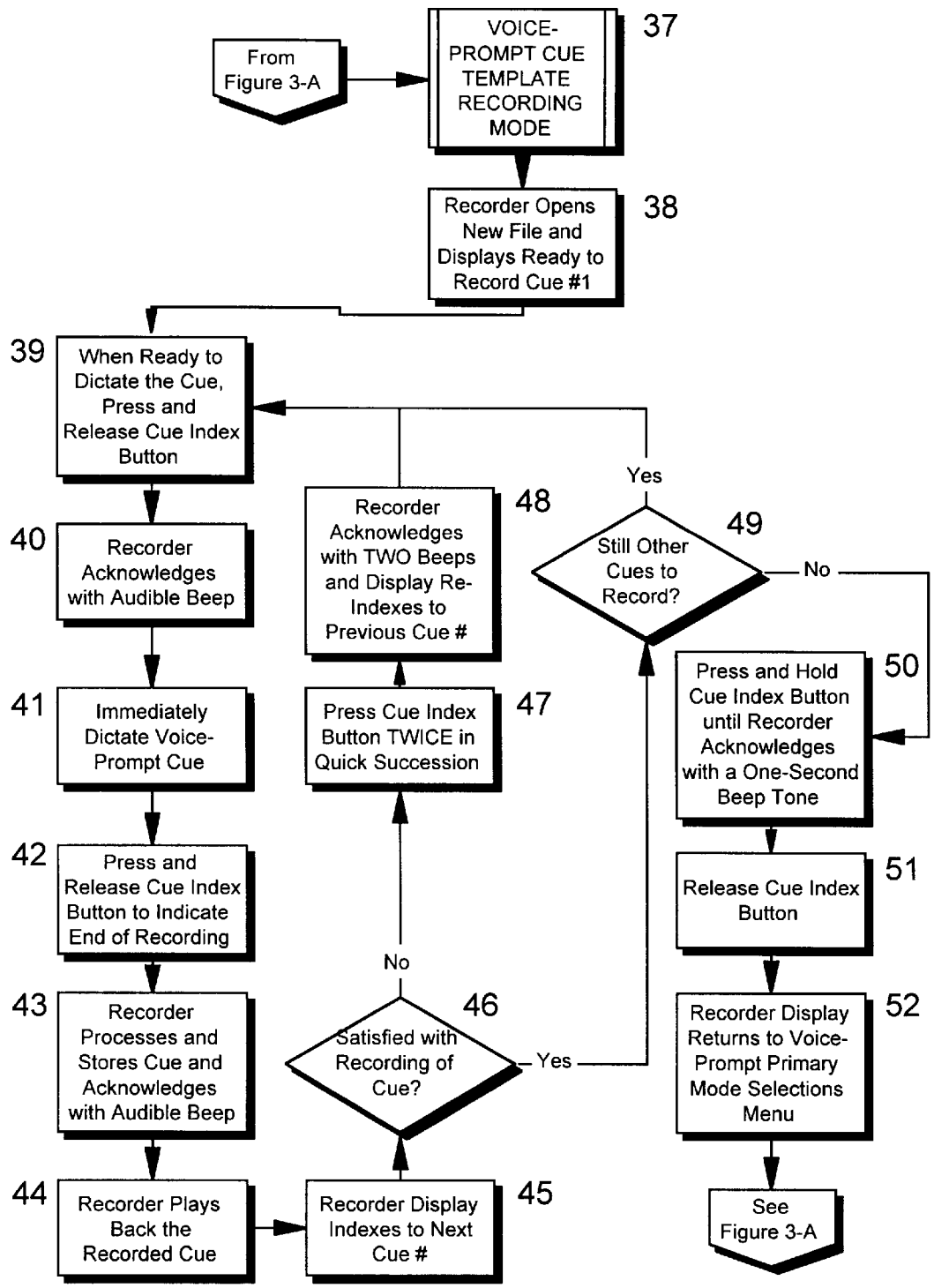
Figure 3-B

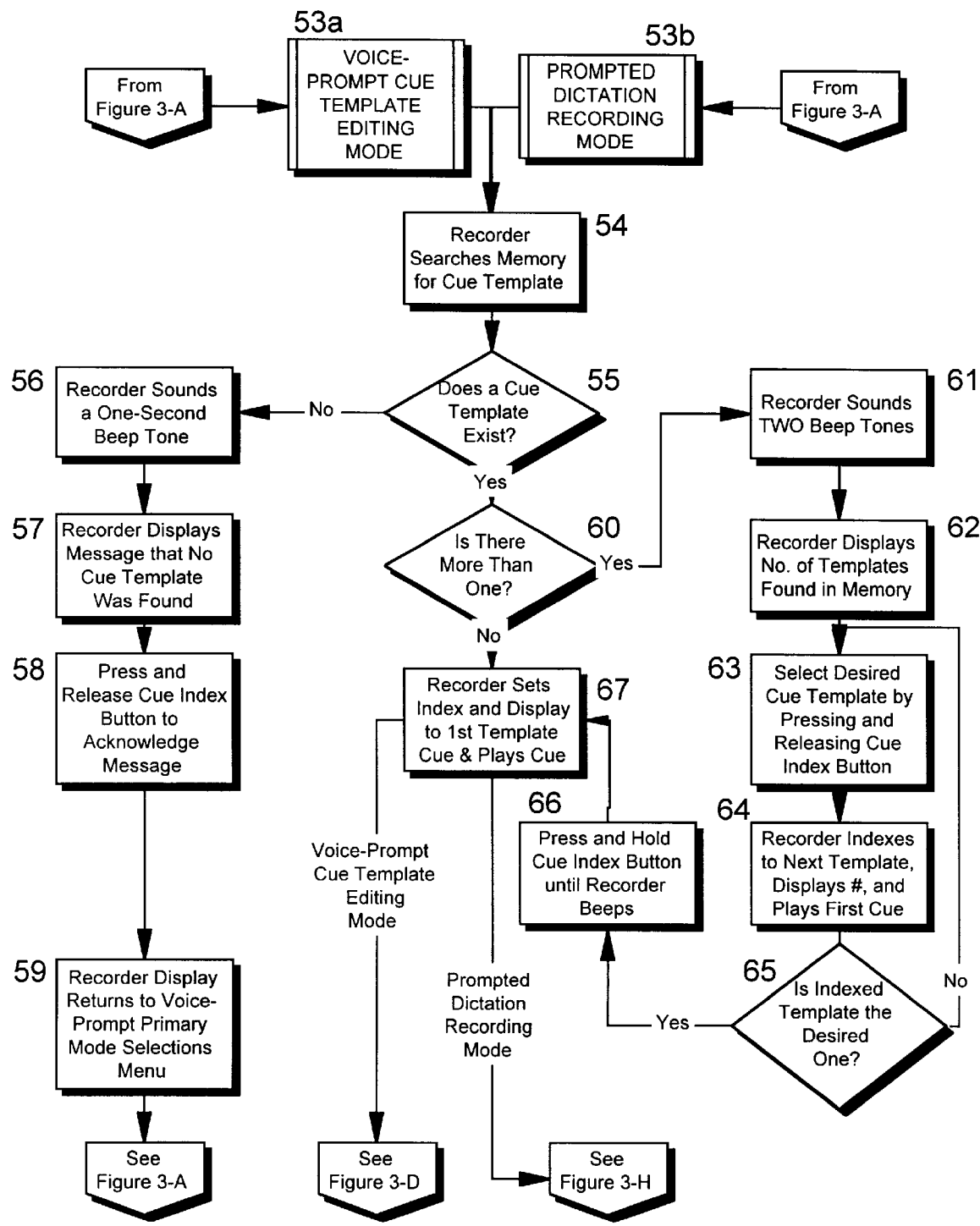
Figure 3-C

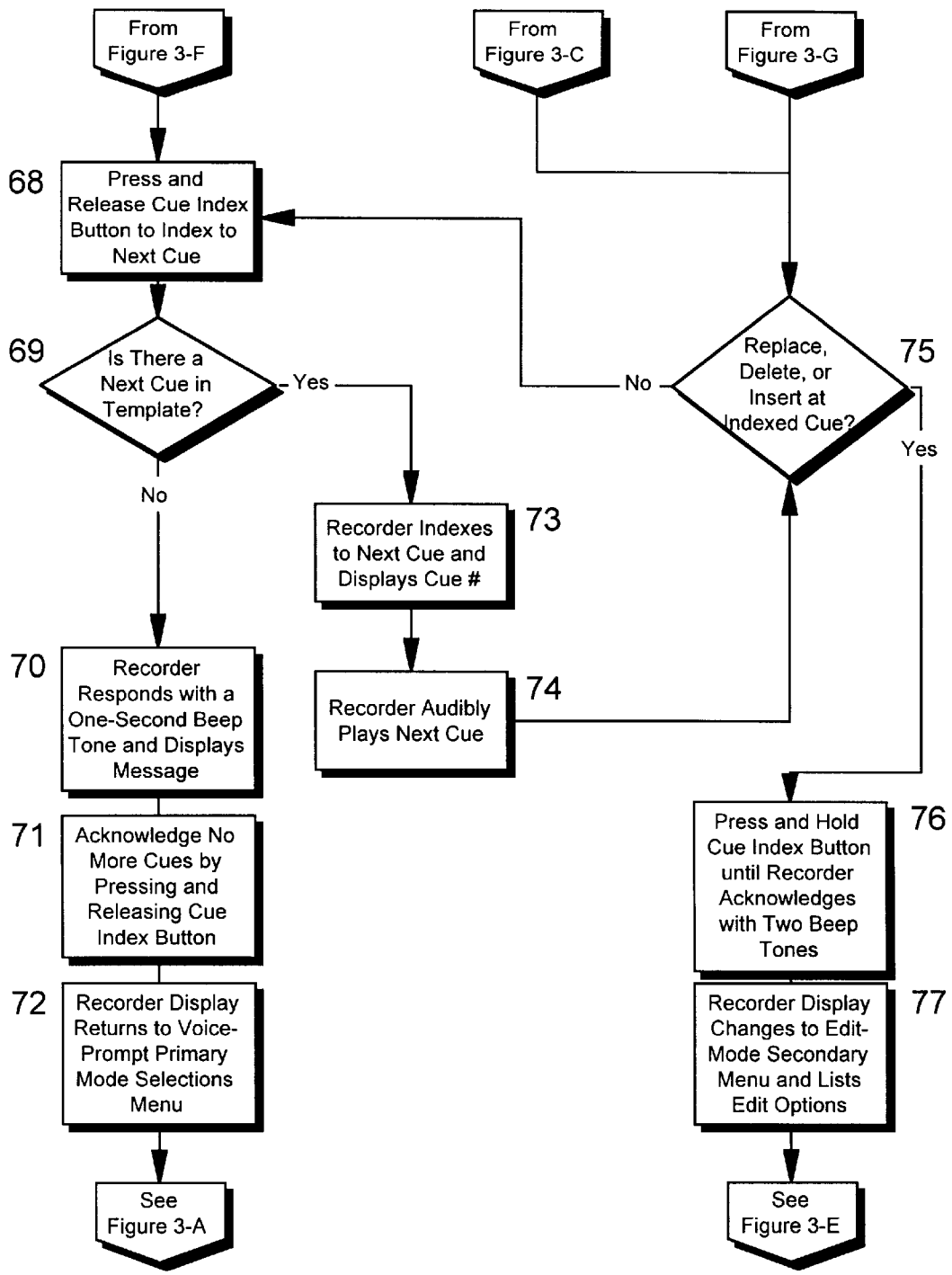
Figure 3-D

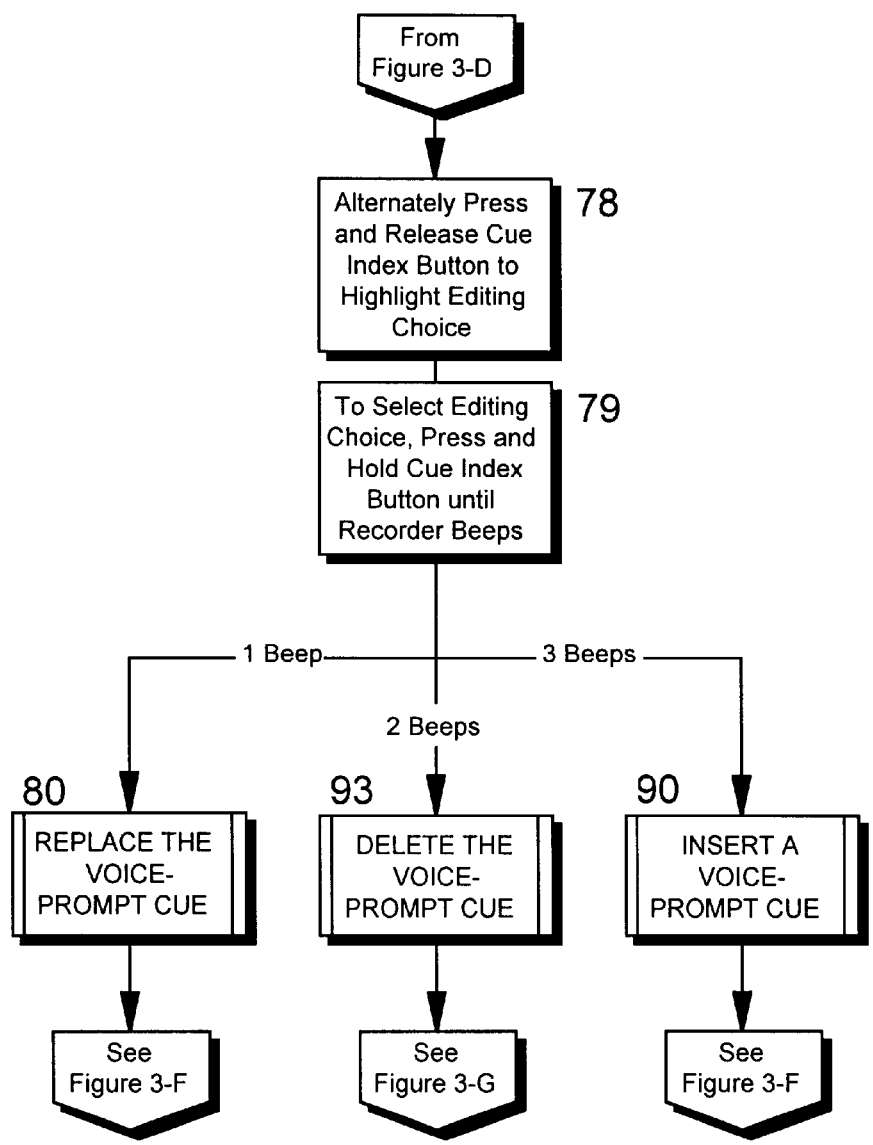
Figure 3-E

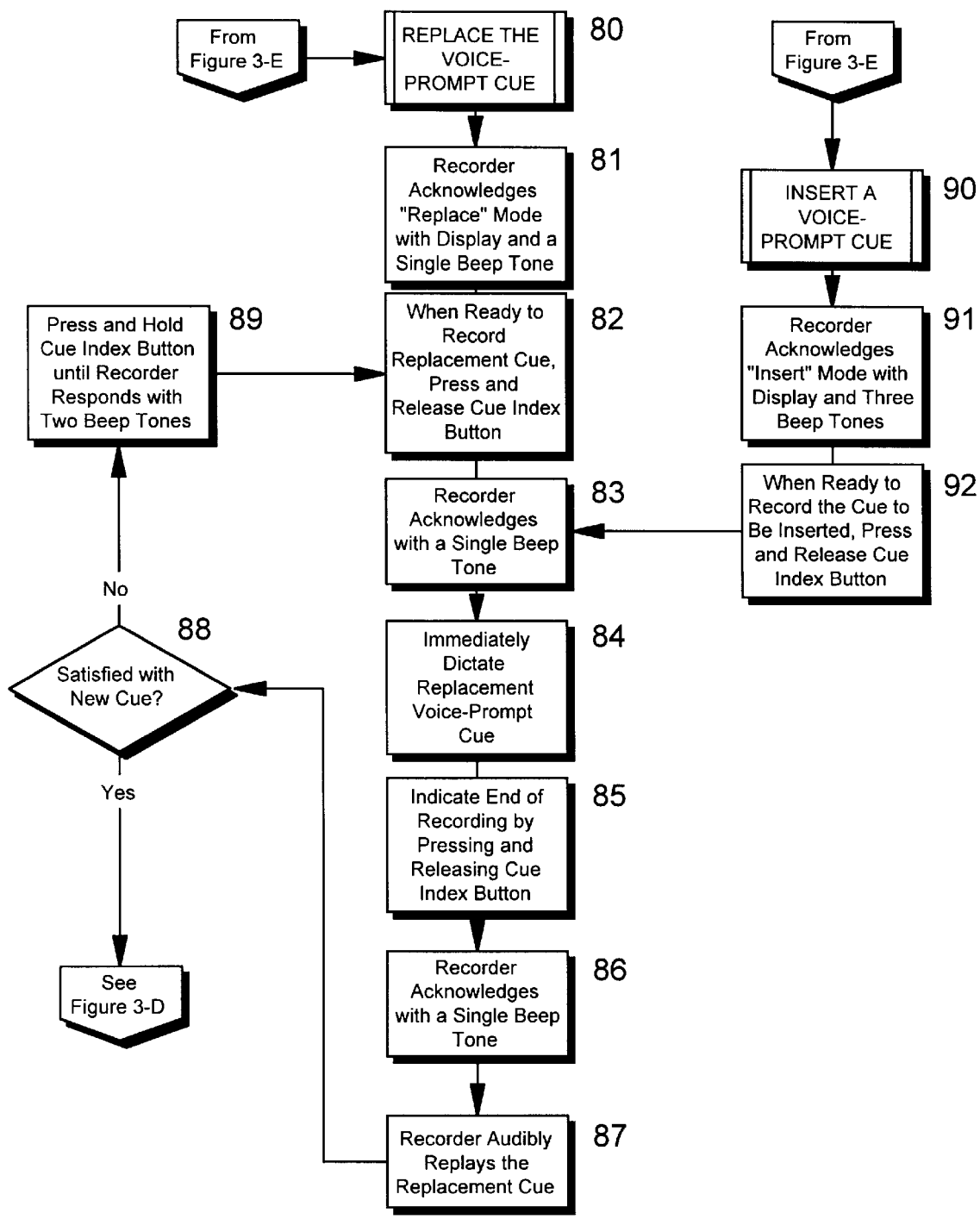
Figure 3-F

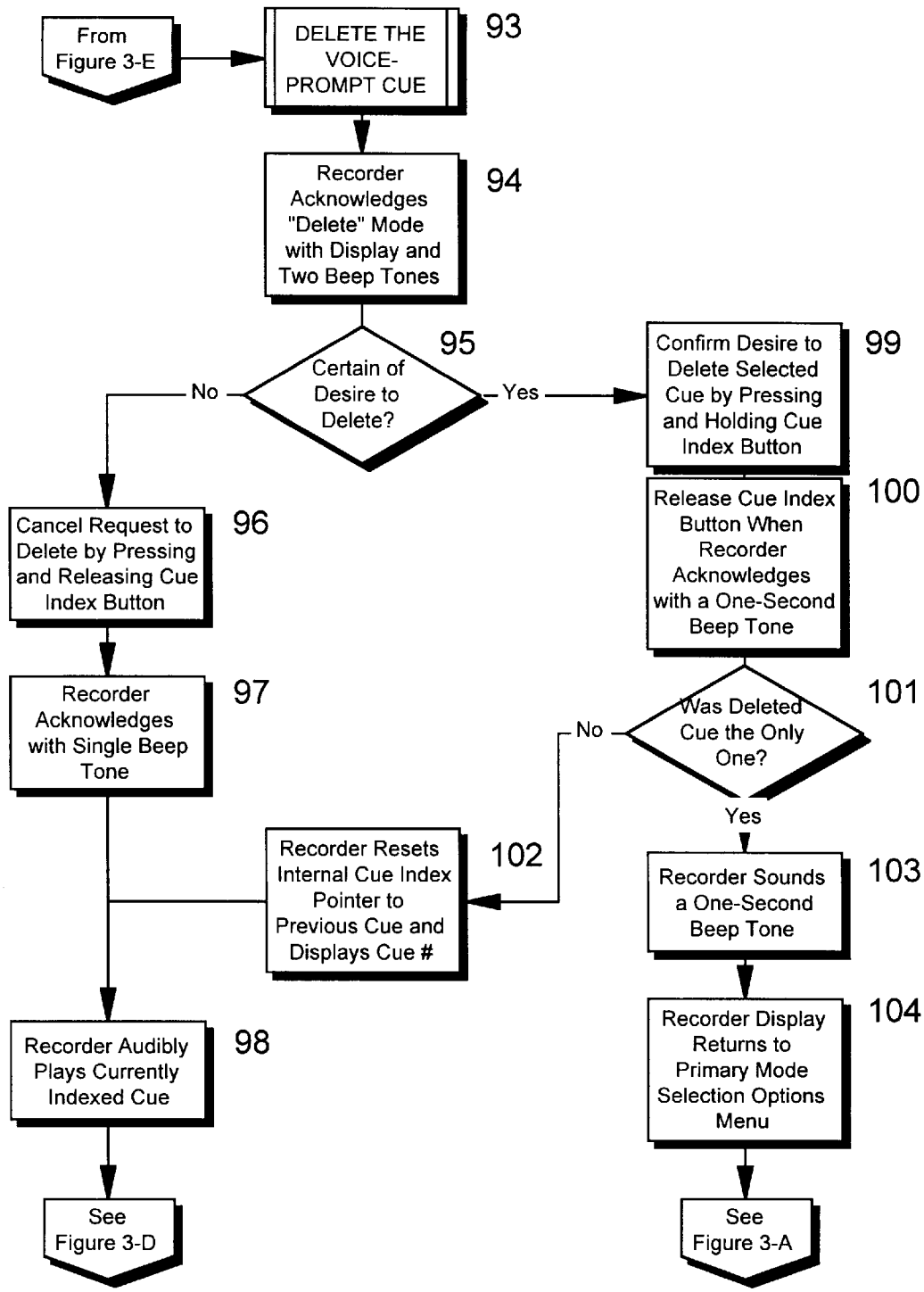
Figure 3-G

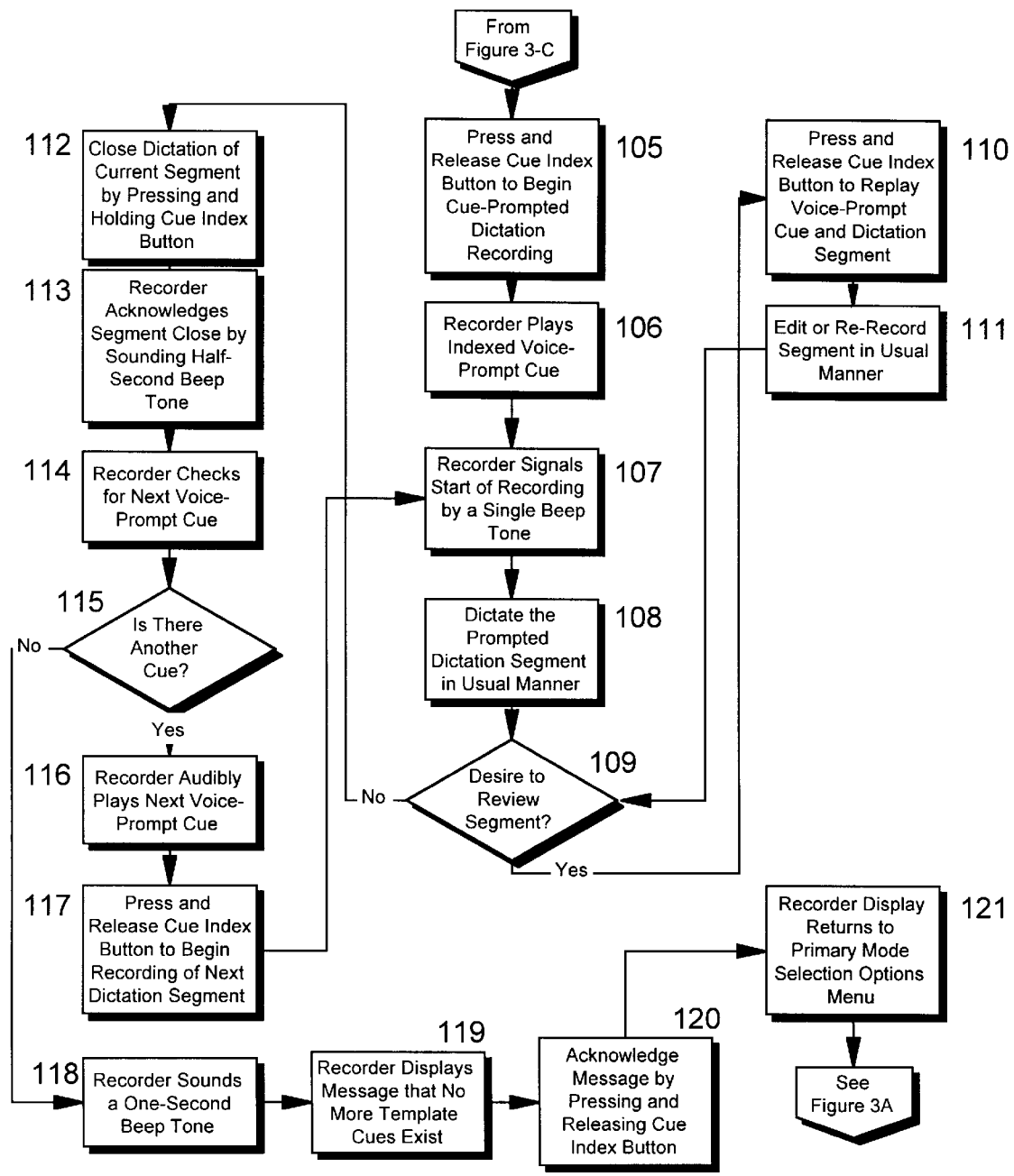
Figure 3-H

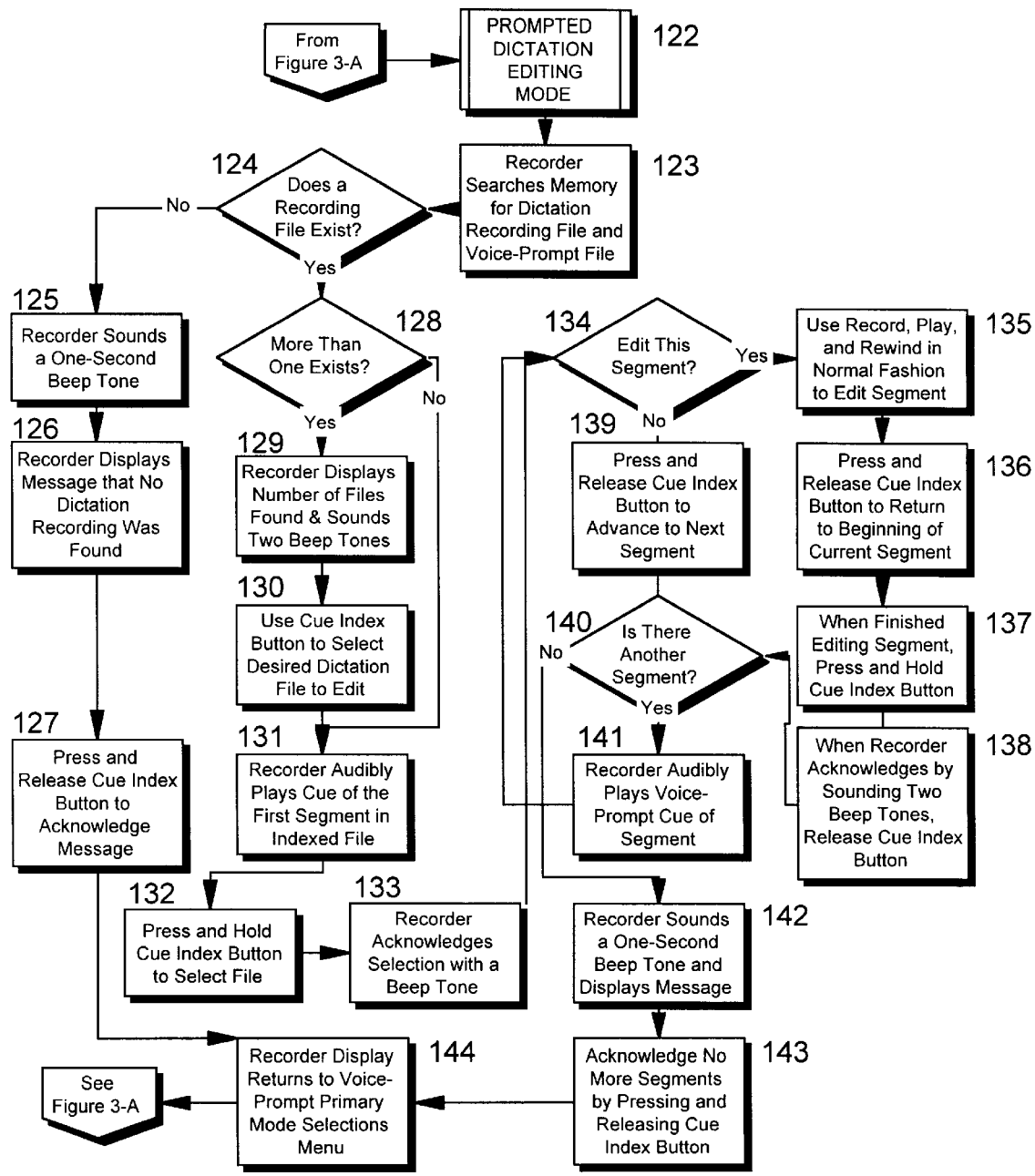
Figure 3-I

VOICE PROMPTING AND INDEXING DICTATION RECORDER

CROSS-REFERENCES TO RELATED APPLICATIONS

Not Applicable.

STATEMENT REGARDING FEDERALLY SPONSORED RESEARCH OR DEVELOPMENT

Not Applicable.

BACKGROUND—FIELD OF INVENTION

This invention relates to personal hand-held dictation recorders, specifically to an improved method for providing cue-and-review indexing and prompting functions during dictation and transcription.

BACKGROUND—DESCRIPTION OF RELATED ART

Dictation recorders, often also referred to as dictating machines, have appeared in many forms. Early forms were bulky desk units operated by controls located on a cable-attached hand-held microphone. Later manifestations have included hand-held tape recorders (e.g., U.S. Pat. No. 4,227,222 to Sato and Kobayashi, 1980), central dictation systems (e.g., U.S. Pat., Nos. 3,936,805 to Bringol, et.al., 1976, and 4,041,249 to Matz and Foster, 1977), digital dictation systems (e.g., U.S. Pat. No. 5,179,627 to Sweet, et.al., 1993), and personal computer dictation systems (e.g., U.S. Pat. No. 5,197,052 to Schroder, et.al., 1993).

Dictation recorders have typically differed from conventional tape recorders in two particular ways. First, since dictation is by nature a repeating start-stop-rewind-play process, dictation recorders require a means to easily facilitate that process. Early dictation recorders incorporated separate buttons or switches for these functions. Later embodiments overcame the clumsiness of the multiple buttons by incorporating all these functions into a single-button slider switch (e.g., U.S. Pat. No. 4,179,714 to Kobayashi, 1979).

Second, since the dictation recording must typically be transcribed, early dictation recorders included a means to record embedded indexing or cuing signals within the dictation recording to facilitate the transcription process. These embedded signals provided demarcations between recorded dictation segments and thus facilitated providing embedded instructions for the transcriptionist during later playback. Early dictation recorders incorporated a separate cue button that when pressed would record these cuing signals on the recording medium. Later recorders included this cue-signal recording feature as an additional function of the single-button slider switch (ibid., Kobayashi, 1979).

Even in their most complex embodiments, however, early patent designs for the recording of embedded cuing or indexing signals focused only on facilitating the transcription process, not the dictation process (e.g., U.S. Pat. Nos. 3,869,720 to Ohira and Takahashi, 1975; 3,972,071 to Arrington, 1976; 4,007,491 to Bolick and Fleming, 1977; 4,041,249 to Matz and Foster, 1977; 4,051,540 to Wilder, et.al., 1977; 4,200,893 to Matison, 1980; 4,224,644 to Lewis and Blum, 1980; 4,343,039 to Smith and Mason, 1982; 4,352,173 to Titus and Bagley, 1982; 4,410,923 to Patel, 1983; etc.).

When prior-art designs for the recording of embedded cuing signals did consider the needs of the dictator, they focused on providing a means for the dictator to locate dictation-segment starting points within the dictation recording (e.g., U.S. Pat. Nos. 4,812,940 to Takenaga, 1989; 4,224,644 to Lewis, 1980; 4,200,893 to Matison, 1980; etc.). A byproduct of most of these cue-signal designs was that the dictator could record instructions for the transcriptionist at the beginning of each cue-signal-demarcated dictation segment (e.g., U.S. Pat. Nos. 3,760,124 to Gaven, 1973; 3,827,079 to Bolick, 1974; 3,881,072 to Becker, 1975; 4,051,540 to Wilder, et.al., 1977; 4,410,923 to Patel, 1983; etc.).

While many prior-art designs thus benefitted the dictator's cue-and-review processes by making it easier to locate and review specific recorded dictation segments, none of these designs provided assistance to the dictator during the initial dictation of those segments. None of the prior-art designs provided a tool to assist the dictator in logically framing his or her thoughts and dictating them in the first place in an orderly way. None of these designs facilitated dictation in conformance with lengthy standardized forms and templates. In summary, early prior-art embedded dictation-index-signal designs focused on facilitating dictation transcription rather than dictation itself. Later prior-art designs provided a means to use embedded index signals to facilitate dictation recording cue and review during a dictation session. All prior-art embedded dictation-index-signal designs are limited to assisting a dictator in post-dictation recording cue and review and to assisting a transcriber in post-dictation transcription. These prior-art designs all provide utility only after a dictation segment is recorded. None of the prior-art designs provide utility for assisting a dictator beforehand with the organization or structure of the material or content to be dictated. None of the prior-art designs provide any means to prompt the dictator beforehand with the next dictation segment topic when dictating in conformance with standardized forms and templates.

OBJECTS AND ADVANTAGES

Especially in highly complex and heavily regulated fields (e.g., medicine, insurance, law, government, etc.), dictators are increasingly finding it helpful or even necessary to dictate lengthy documents according to strict and elaborate forms or templates. A dictator may refer to printed copies of these forms and templates during dictation, but keeping up with and using them when out of the office is difficult. Dictating without the printed forms or templates is also subject to errors and omissions, especially when the templates change frequently or when the dictator must dictate to several different ones. Further, printed forms and templates are difficult to personalize.

Accordingly, the primary objects and advantages of this invention are to provide the dictating user of personal hand-held dictation recorders with a means:

(a) to prerecord and save a readily available and reusable personalized dictation template in the form of corresponding personally recorded voice-prompt dictation cues, (b) to retrieve and audibly replay these prerecorded voice-prompt dictation cues during any later dictation recording session as a means to dictation in concert with those cues, and (c) to use the replayed voice-prompt dictation cues collectively as an aid to dictation in conformance with a corresponding list, outline, instruction set, or standard form.

Further objects and advantages of this invention are to provide the dictating user of personal hand-held dictation recorders with a means:

(a) to flexibly delete, revise, or replace any number or all of the voice-prompt dictation cues for any previously recorded voice-prompt dictation template, (b) to electronically index and link each of the voice-prompt dictation cues to its corresponding dictation session recorded segment, (c) to automatically audibly replay the corresponding dictation-segment-specific voice-prompt when a dictated segment is cued in a cue-and-review process, (d) to be thus reminded of the content of each voice-prompt-specific recorded dictation segment without having to replay any part of that segment, (e) to optionally direct and enable each of the voice-prompt dictation cues to be automatically included as the first integral part of its corresponding dictation session recorded segment, (f) to thus optionally direct and enable each of the voice-prompt dictation cues to be automatically included as part and parcel of the final total dictation recording, and (g) to thereby provide a transcriptionist with standardized content or cues to be used in typing paragraph or section titles or headers during the dictation transcription process.

Still further objects and advantages of this invention will become apparent from a consideration of the drawings and ensuing description.

SUMMARY OF THE INVENTION

In accordance with the present invention, an improvement to personal hand-held dictation recorders wherein the improvement comprises a method for separately and independently recording and storing and, during any later dictation recording session, separately retrieving and audibly replaying multiple dictation-indexing voice-prompt dictation cues as a means to aid dictation in conformance with a corresponding list, outline, instruction set, or standard form represented by the voice-prompt cues.

BRIEF DESCRIPTION OF THE DRAWINGS

In the drawings, closely related figures have the same number but different alphabetic suffixes.

FIGS. 3-A to 3-I is a detailed flowchart depiction of the operation of a typical embodiment of this invention wherein the embodiment is in the form of a personal hand-held digital dictation recorder.

DETAILED DESCRIPTION OF THE INVENTION

Figure 1:
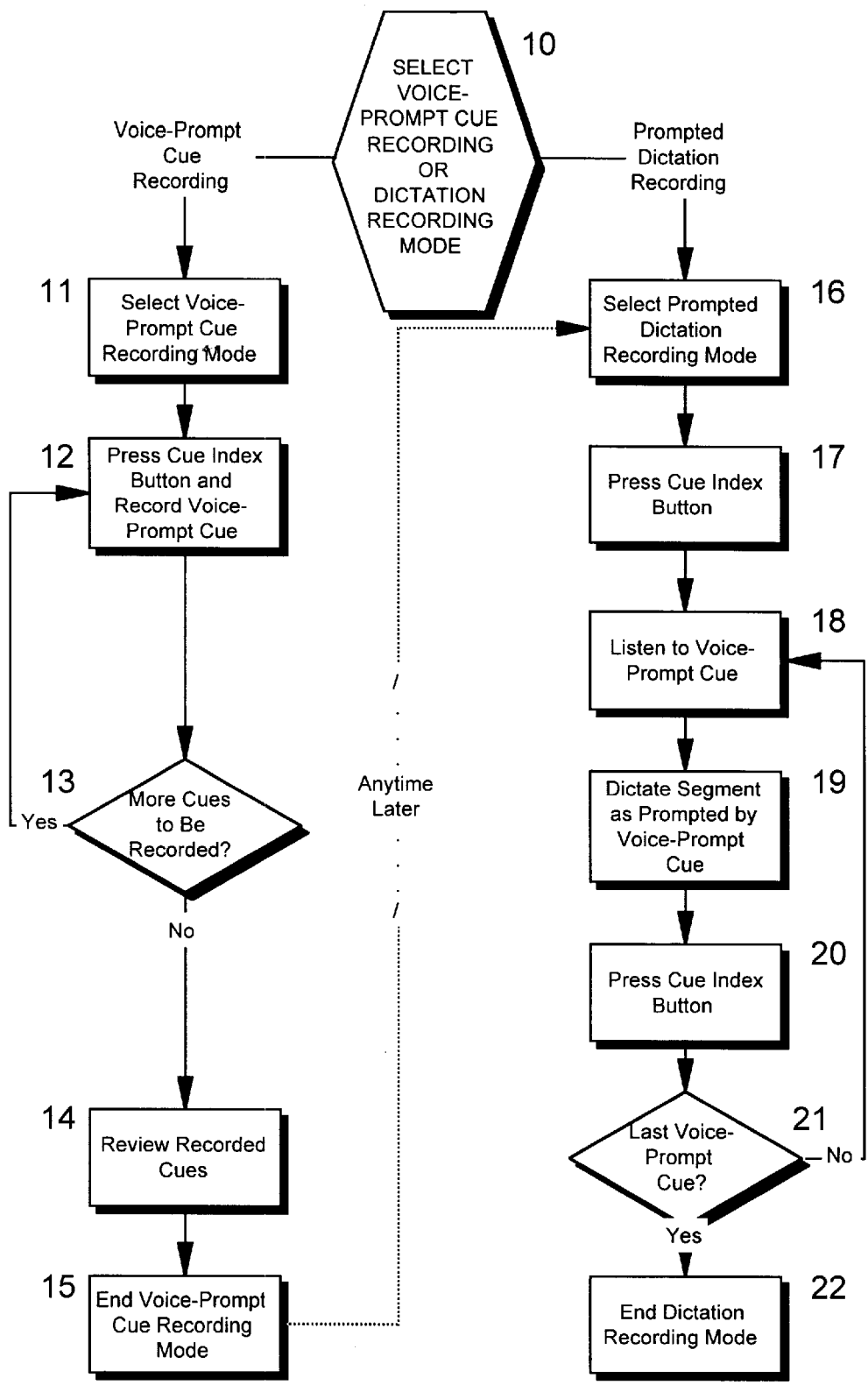
FIG. 1 is a simplified graphic overview of the essential voice-prompt cue recording and voice-prompted dictation recording capabilities in a typical embodiment of this invention.

Detailed Description—FIG. 1

A typical embodiment of this invention minimally comprises a method for a dictator to personally prerecord multiple dictation-indexing voice-prompt cues and a method for her to individually replay these cues during a later dictation recording session. FIG. 1 illustrates these minimal voice-prompt-cues recording and prompted-dictation recording capabilities. Consistent with the operation of this invention, the figure depicts voice-prompt cue recording (11–15) and prompted dictation recording (16–22) as separate but interrelated processes.

Accordingly, FIG. 1 shows that the dictator is provided a means to select either of two recording modes (10). Selecting the voice-prompt-cue recording mode (1 1) provides the dictator with a means to record a voice-prompt cue (12) and repeat the process (13) until all cues are recorded. The dictator is then provided a means to review all the recorded cues (14) before ending the voice-prompt cue recording mode (15).

Having completed the recording of the voice-prompt cues template (15), the dictator is provided a means whereby he may at any later time select the prompted-dictation recording mode (16) to dictate in concert with his personally prerecorded voice-prompt cues. In this mode, the dictator is provided a cue index button (17) or other equivalent means to successively replay and listen to the prerecorded voice-prompt cues (18). The dictator is then provided means to dictate a corresponding dictation segment as prompted by the replayed cue (19), index to the next prerecorded cue (20), and continue the listening (18) and dictating (19) process until the dictation is complete for the last cue (21) and the voice-prompted dictation recording mode is ended (22).

A minimum embodiment of this invention will include means to provide each of the capabilities described above. Regardless of the means used in any embodiment of this invention, these means in combination will minimally provide a dictator with the ability to personally prerecord a set of voice-prompt cues and later dictate in concert with those cues. These capabilities therefore form the core features for more elaborate embodiments of this invention.

Figure 2:
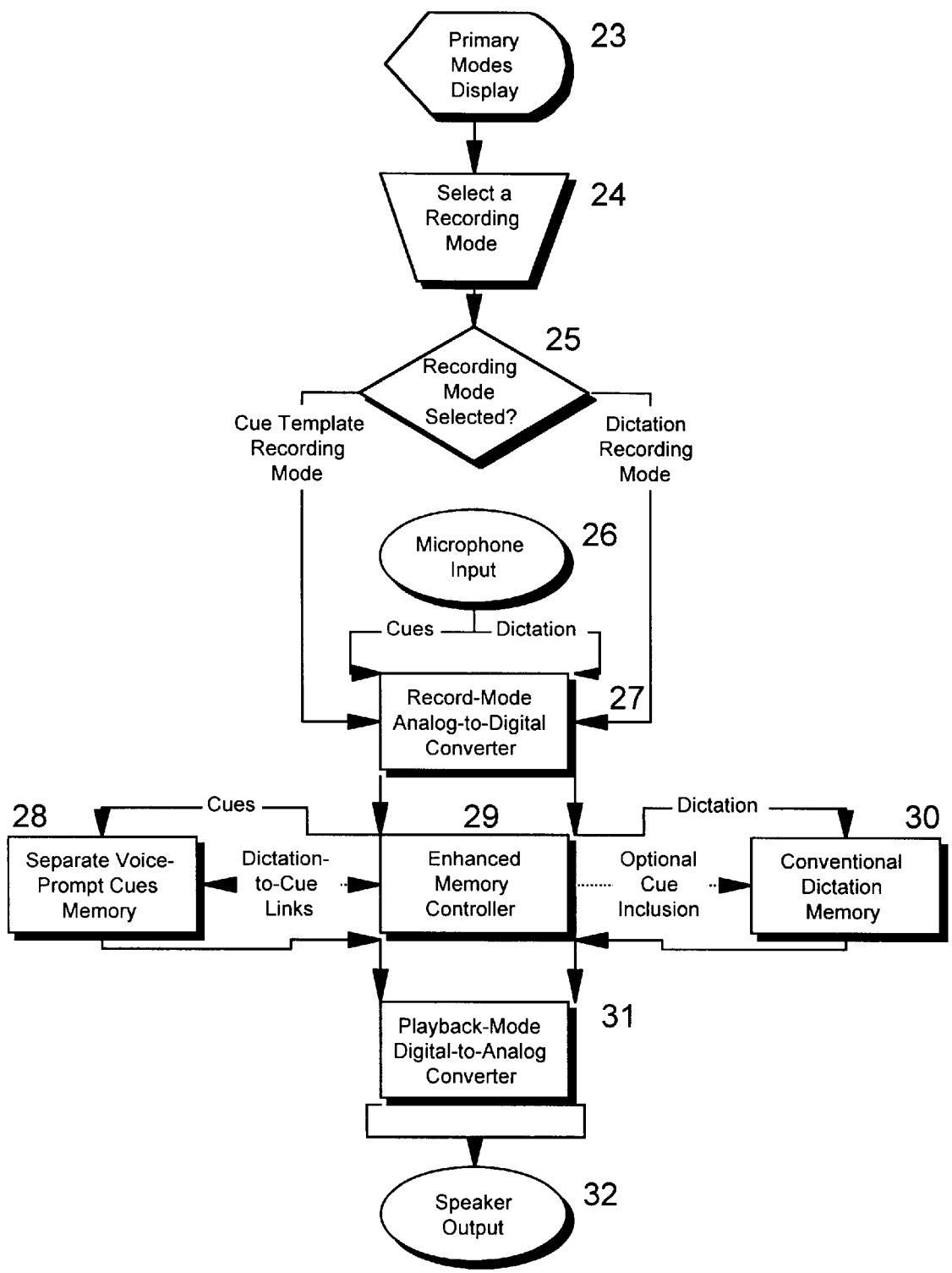
FIG. 2 is a simplified graphic illustration of the functions and interrelationships of the essential component parts in a typical embodiment of this invention.

Detailed Description—FIG. 2

A typical embodiment of this invention comprises an improvement for conventional personal hand-held dictation recorders. Specifically, a typical minimum embodiment of this invention comprises a means to separately and independently record and store one or more sets of personalized dictation-indexing voice-prompt cues. It also comprises a means to separately retrieve and replay these voice-prompt cues as dictation-indexing prompts during any later dictation recording session. A somewhat more elaborate typical embodiment further comprises a means to index and link each memory-stored voice-prompt cue to its corresponding recorded dictation session segment as a means to improve conventional dictation cue, review, and edit processes. Finally, a still more elaborate typical embodiment comprises providing a dictator with a means to include each voice-prompt cue as the first integral part of its corresponding final dictation segment recording as an aid to later dictation recording transcription.

FIG. 2 is a simplified graphic illustration of how a typical embodiment of this invention provides all these innovative enhancements. FIG. 2 applies equally well to all embodiments of digital dictation recorders.

Consistent with the above, the innovative differences between a typical embodiment of this invention and conventional dictation recorders include the following elements graphically illustrated in FIG. 2:

(a) a means to separately select (24–25) from a display of primary modes (23) either voice-prompt cue template recording mode or dictation recording mode, (b) a means to individually input (26), digitally process (27), and store (29) the voice-prompt cues in a voice-prompt-cues memory (28) that is logically separate, if not also physically different, from a dictation memory (30) under the control of an enhanced memory controller (29), (c) a means to index and link each stored voice-prompt cue (28) to its corresponding stored dictation recording segment (30), and vice-versa, under the control of the referenced enhanced memory controller (29), and (d) a means to play back the stored voice-prompt cues (28) and stored dictation segments (30), separately or in indexed coordination, via the referenced enhanced memory controller (29), playback-mode digital-to-analog converter (31), and conventional speaker (32).

Both the record-mode analog-to-digital converter (27) and the playback-mode digital-to-analog converter (31) are of conventional design, though modifications may be necessary in some embodiments in order to interface with the enhanced and more complex memory controller (29). The microphone (26) with its associated audio-input preamplifier (not shown) and the speaker (32) with its audio-output amplifier (not shown) are of conventional designs. The primary-modes display (23) may be a conventional liquid-crystal display (i.e., LCD) or any other equivalent means to display or indicate recording and playback options and selections. The means to select the recording (and playback) mode (24) may be a cue index button of conventional design or any other equivalent means to select modes of operation.

Though the voice-prompt cues memory (28) is logically separate from the dictation memory (30), both of these memories may physically reside within the same storage medium. A typical embodiment may be a non-volatile flash memory module of conventional design internal to the dictation recorder, a removable non-volatile flash memory card of conventional design, or other equivalent internal or removable digital storage media.

The enhanced memory controller (29) comprises the most significant and complex difference between a typical embodiment of this invention and typical dictation recorders of conventional design. This enhanced memory controller directs all the logic functions necessary to maintain the required separation of voice-prompt cues input (26), analog-to-digital conversion (27), and storage (28) from dictation input (26), analog-to-digital conversion (27), and storage (30). Though it ensures this separation, it also directs all the functions necessary to establish correlated indexes and maintain the logical links between the voice-prompt-cues index and the dictation-recording-segment index. The enhanced memory controller ensures that the integrity of these links is maintained throughout all dictation recording, cuing, reviewing, and editing processes. As an option selected by the dictator, the enhanced memory controller also directs the incorporation of each voice-prompt cue as the first integral part of its respective stored dictation recording segment as an aid to later transcription.

Detailed Description—FIGS. 3-A to 3-I

FIGS. 3-A to 3-I conjointly depict the operation of a typical embodiment of this invention in a personal hand-held digital dictation recorder. Whereas the assumed embodiment in FIGS. 1 and 2 provides only a minimal core set of features as described above, the assumed embodiment in combined FIGS. 3-A to 3-I provides a significantly more advanced feature set in a more elaborate embodiment. The flowchart method of presentation is intended to facilitate the description of the internal operation of the embodiment and how a dictator interacts with and uses the described features.

Though FIGS. 3-A to 3-I assume a personal hand-held digital dictation recorder embodiment, the description of operation in the following paragraphs is applicable to all other typical embodiments of this invention.

The objective of FIGS. 3-A to 3-I, in combination with FIGS. I and 2 and the following description, is to provide sufficient functionality and utility detail for anyone skilled in the art to design and produce this invention in the described or any other typical embodiment.

Detailed Description: Primary Mode Selection-FIG. 3-A

The dictator initially prepares for voice-prompt cue recording (33) in advance by either selecting or creating a list, outline, instruction set, or standard form in conformance with which she frequently dictates. Each of the elements in the list, outline, instruction set, or standard form will be recorded as separate and independent voice-prompt dictation-indexing cues. The dictator may change the wording of these elements prior to starting the recording process to suit her purposes. For example, she may only want single-word cues to prompt her during later dictation sessions to record corresponding dictation segments. Alternatively, she may want to record longer cues to serve also as paragraph or section titles or headers to be included in the transcription of later dictation session recordings. When the voice-prompt cues template is complete, the dictator powers on the recorder (34).

Once the recorder is powered on (34), it displays the primary-mode selection options (35). The primary modes include voice-prompt cue template recording mode (37 and FIG. 3-B), voice-prompt cue template editing mode (53a and FIGS. 3-C to 3-G), prompted dictation recording mode (53b and FIGS. 3-C and 3-H), and prompted dictation editing mode (122 and FIG. 3-I). A means to display the primary-modes selection options (35), as well as all other display options and messages to be described below, in a typical preferred embodiment is a liquid-crystal display (LCD) of conventional design, or equivalent. This display means will be referenced hereafter as the recorder display or simply the display.

The dictator may select any of the alternative displayed modes as desired (36). A means to select modes must be provided. A selection means in a typical preferred embodiment is a two-push-button momentary-contact switch combination. In this embodiment, one button is used to highlight options in the display and the other button is then used to select or activate the highlighted option. Alternative selection means in typical embodiments include a three-push-button momentary-contact switch combination and a single-push-button momentary-contact switch. In order to simplify the description, the means assumed hereafter in this description of operation is the single-push-button momentary-contact switch. This single-push-button selection means will be referred to hereafter as the cue index button.

Detailed Description: Voice-Prompt Cue Template Recording Mode—FIG. 3-B

When the dictator first selects the voice-prompt cue template recording mode from the recorder display (35–37 in FIG. 3-A), the recorder enhanced memory controller (29 in FIG. 2) allocates separate memory space (28 in FIG. 2) for the new voice-prompt cues template file (38) and the recorder display (23 in FIG. 2) indicates readiness to record the first voice-prompt cue in the template (38). The dictator acknowledges readiness to begin recording the first voice-prompt cue by pressing and releasing the cue index button (39). In turn, the recorder prompts the dictator to begin speaking by a short audible beep tone (40), hereafter referred to simply as a beep. The dictator immediately dictates the first voice-prompt cue (41) and indicates when finished dictating that cue by pressing and releasing the cue index button (42). During the cue dictation, the recorder enhanced memory controller (29 in FIG. 2) transfers the digitized cue from the analog-to-digital converter (27 in FIG. 2) to the separate and independent voice-prompt cue storage area in memory (28 in FIG. 2). The recorder acknowledges the end of this process with a beep (43), immediately replays the recorded cue (44) via the enhanced memory controller and digital-to-analog converter (29 and 31 in FIG. 2), and indexes the recorder display to the next-higher cue number (45). The recorder display then provides the dictator with the option (46) to reject and rerecord the voice-prompt cue. The dictator indicates a desire to rerecord the cue by pressing and releasing the cue index button twice in quick succession (47). The recorder acknowledges the dictator's desire to rerecord the cue with two beeps and by resetting the recorder display cue index to the previous cue number (48). The dictator then indicates readiness to rerecord the cue in the manner of the previous recording (39–46).

Once the dictator is satisfied (46) with the replay (44) of the recorded voice-prompt cue, the recorder display provides the option (49) to record another cue in the previous manner (39–46) or to accept and close the voice-prompt cue template file. The dictator indicates the desire to accept and close the file by pressing and holding the cue index button until the recorder acknowledges acceptance with a one-second beep (50). Upon releasing the cue index button (51) after the one-second beep (50), the recorder display returns to the voice-prompt primary-modes menu (52) in order to again display the primary-modes selection options (35 in FIG. 3-A).

The result of this operation is a template file stored in logically separate and independent memory (28 in FIG. 2) in the form of multiple independent and separately indexed digitized voice-prompt cues. This template and its associated voice-prompt cues may now be edited (FIGS. 3-C to 3-G) or used to provide the voice-prompt cues in prompted dictation recording mode (FIGS. 3-C and 3-H) and prompted dictation editing mode (FIG. 3-I).

Detailed Description: Voice-Prompt Cue Template Editing Mode—FIGS. 3-C to 3-G FIG. 3-C shows that when the dictator selects the voice-prompt cue template editing mode from the recorder display (35–36 and 53*a* in FIG. 3-A), the recorder enhanced memory controller (29 in FIG. 2) searches in the separate voice-prompt cues memory (28 in FIG. 2) for an existing prerecorded cues template (54). If the enhanced memory controller does not locate a cues template (55), it sounds a one-second beep (56) and displays a message that no cue template can be found (57). The dictator acknowledges this beep and message by pressing and releasing the cue index button (58). Upon releasing the cue index button (58), the recorder display returns to the voice-prompt primary-modes menu (59) in order to again display the primary-modes selection options (35 in FIG. 3-A). If the enhanced memory controller does locate a cues template (55), it then searches for yet other templates (60) in the separate voice-prompt cues memory (28 in FIG. 2). If no other templates are found, the enhanced memory controller sets an internal index pointer to the first voice-prompt cue in the located template, displays the template and cue number, and audibly plays the first voice-prompt cue in the template (67). However, if the enhanced memory controller (29 in FIG. 2) locates more than one stored template in memory, the recorder sounds two beeps (61) and the recorder display indicates the number of cue templates found in memory (62). The dictator then selects the desired cue template by alternately pressing and releasing the cue index button (63) and listening to the audible replay of the first cue in the selected template (64). When the desired template is found (65), the dictator presses and holds the cue index button until the recorder provides a single acknowledging beep (66). The enhanced memory controller (29 in FIG. 2) sets an internal index pointer to the first voice-prompt cue in the selected template, displays the template and cue number, and again audibly plays the first voice-prompt cue in the template (67).

Having located the voice-prompt cue template to be edited, in FIG. 3-D the dictator is given the option (75) of either replacing or deleting the indexed voice-prompt cue or inserting an additional cue into the template immediately before the indexed cue. The dictator leaves the template unchanged at the indexed cue and advances to the next cue by pressing and releasing the cue index button (68). In that instance, if the enhanced memory controller (29 in FIG. 2) determines (69) that the indexed voice-prompt cue is the last one in the selected template, the recorder responds with a one-second beep and a message that no other cues remain (70). The dictator acknowledges the beep and message by pressing and releasing the cue index button (71). The recorder display then returns to the voice-prompt primary-modes menu (72) in order to again display the primary-modes selection options (35 in FIG. 3-A). Alternatively, if the enhanced memory controller (29 in FIG. 2) determines that another voice-prompt cue exists in the template, it increments its internal index to the next voice-prompt cue and displays the cue number (73). The recorder then audibly replays the indexed cue (74) and again provides the dictator with the option (75) of either replacing or deleting the indexed voice-prompt cue or inserting an additional cue into the template immediately before the indexed cue. The dictator indicates a desire to replace, delete, or insert at the indexed cue by pressing and holding the cue index button until the recorder acknowledges the selection with two beeps (76). When the cue index button is released, the recorder display changes to the edit-mode secondary menu and lists the edit-mode options (77).

In FIG. 3-E, the dictator then alternately presses and releases the cue index button to move the menu-options highlight to the desired edit menu choice (78). When the desired option is highlighted, the dictator presses and holds the cue index button until the recorder beeps a corresponding acknowledgment (79) of one beep to replace (80), two beeps to delete (93), or three beeps to insert (90) at the current cue-index location.

The recorder responds to a request to replace the currently indexed voice-prompt cue (80) in FIG. 3-F by sounding a single beep and displaying a replace-mode status message (81). The dictator presses and releases the cue index button to indicate his readiness to record the replacement voice-prompt cue (82). The recorder initiates record mode with an acknowledging single beep (83). The dictator immediately dictates the replacement voice-prompt cue (84) and indicates the end of dictation of the cue by pressing and releasing the cue index button (85). The recorder acknowledges the end of the recording with a single beep (86) and then audibly replays the replacement voice-prompt cue (87) for confirmation of the dictator's satisfaction with the recording (88). If the replacement-cue recording is satisfactory, the dictator accepts the replacement voice-prompt cue and advances the recorder display to the next template cue by pressing and releasing the cue index button (68 in FIG. 3-D). If the replacement-cue recording is not satisfactory, the dictator presses and holds the cue index button until the recorder acknowledges with two beeps (89). The dictator then rerecords the replacement voice-prompt cue in the same manner as before (82–88) by pressing and releasing the cue index button to repeat the recording process (82).

Alternatively, the recorder responds in FIG. 3-F to a request to insert a voice-prompt cue at the current index location (90) by sounding three beeps and displaying an insert-mode status message (91). As with the edit-mode cue-replacement option, the dictator presses and releases the cue index button to indicate readiness to record the voice-prompt cue to be inserted (92). The recorder initiates record mode with an acknowledging single beep (83). From that point, operation is the same as with the preceding edit-mode voice-prompt cue-replacement option (82–89 in FIG. 3-F, and 68 in FIG. 3-D).

In FIG. 3-G, the recorder responds to a request to delete the indexed voice-prompt cue (93) by sounding two beeps and displaying a delete-mode status message (94). The recorder display then prompts the dictator to confirm the request to delete the indexed voice-prompt cue (95). The dictator optionally cancels the request to delete the cue by pressing and releasing the cue index button (96) or confirms the request to delete the cue by pressing and holding the cue index button (99). If the dictator elects to cancel the deletion request (96), the recorder acknowledges with a single beep (97) and audibly replays the currently indexed cue for confirmation that it was not deleted (98). The recorder display then again provides the dictator with the options (75 in FIG. 3-D) of either replacing or deleting the indexed voice-prompt cue or inserting an additional cue into the template immediately before the indexed cue. If the dictator elects instead (95) to confirm the delete request by pressing and holding the cue index button (99), the recorder acknowledges with a one-second beep (100). The enhanced memory controller (29 in FIG. 2) removes the deleted voice-prompt cue from memory and determines whether there are any remaining cues in the selected voice-prompt cue template (101). If the enhanced memory controller determines that there are no other remaining cues, the recorder sounds a one-second beep (103) and the recorder display returns to the primary-modes options menu (104) in order to again display the primary-modes selection options (35 in FIG. 3-A). However, if the enhanced memory controller determines (101) that other voice-prompt cues remain in the stored template, it resets the internal cue index and the displayed cue number to the previous voice-prompt cue number (102). The recorder then audibly replays the indexed cue (98). The recorder display once again provides the dictator with the options (75 in FIG. 3-D) of either replacing or deleting the indexed voice-prompt cue or inserting an additional cue into the template immediately before the indexed cue.

Detailed Description: Prompted Dictation Recording Mode–FIGS. 3-C and 3-H

FIG. 3-C shows that when the dictator selects the prompted dictation recording mode from the recorder display (35–36 and 53b in FIG. 3-A), the recorder uses the same process (54–67) to identify the desired template as it does in the previously described voice-prompt cue-template editing mode (FIGS. 3-C to 3-G). When this template identification process (54–67) is complete and the desired prompted-dictation voice-prompt cue template is found, indexed, and displayed (67), the dictator presses and releases the cue index button to begin cue-prompted dictation recording (105 in FIG. 3-H). The recorder plays the indexed first voice-prompt cue in the template (106) and signals the start of the recording session by sounding a single beep (107). The dictator then proceeds to dictate the first dictation segment as prompted by the first voice-prompt cue (108). When the dictator completes the dictation of the first segment, she optionally (109) cues and reviews the segment by pressing and releasing the cue index button to replay the voice-prompt cue and the dictated segment (110) and edits or rerecords the segment in the usual manner (111). When the dictator is pleased with the dictated segment recording (109), she closes the dictation of the current dictation segment by pressing and holding the cue index button (1 12) until the recorder acknowledges closure of the segment by sounding a one-half-second beep (113). The recorder enhanced memory controller (29 in FIG. 2) then checks for the next voice-prompt cue (114). If another cue exists in the template (1 15), the recorder audibly plays the cue (116). The dictator then presses and releases the cue index button to begin recording the next cue-prompted dictation segment (1 17). In the same manner as before, the recorder signals the start of the segment recording session by sounding a single beep (107). The process (107–117) continues until the recorder enhanced memory controller (29 in FIG. 2) finds no more voice-prompt cues in the stored template (I 15), sounds a one-second beep (118), and displays a message that no more template cues exist (119). The dictator acknowledges the message by pressing and releasing the cue index button (120). The recorder display then returns to the voice-prompt primary-modes menu (121) in order to again display the primary-modes selection options (35 in FIG. 3-A).

Detailed Description: Prompted Dictation Editing Mode—FIG. 3-I

FIG. 3-I shows that when the dictator selects the prompted dictation editing mode from the recorder display (35–36 and 122 in FIG. 3-A), the recorder enhanced memory controller (29 in FIG. 2) searches (123) the dictation recording memory (30 in FIG. 2) for a dictation recording file and searches the separate voice-prompt cues memory (28 in FIG. 2) for a corresponding voice-prompt cues template. If the enhanced memory controller (29 in FIG. 2) does not find a dictation recording file in memory (124), the recorder sounds a one-second beep (125) and displays a message that no dictation recording was found (126). The dictator presses and releases the cue index button to acknowledge the message (127). The recorder display then returns to the voice-prompt primary-modes menu (144) in order to again display the primary-modes selection options (35 in FIG. 3-A).

If the recorder enhanced memory controller (29 in FIG. 2) locates a dictation recording file (124), it proceeds to determine if more than one such file exists in the dictation recording memory (128). If more than one file is found, the recorder displays the number of files found and sounds two beeps (129). The dictator alternately presses and releases the cue index button to index to the desired file (130) as the recorder audibly plays the voice-prompt cue of the first segment of each successively indexed file ( 131). To select the chosen file for editing, the dictator presses and holds the cue index button (132) until the recorder acknowledges with a single beep (133).

If the dictator chooses (134) to edit the first dictation recording segment, he uses the record, play, and rewind features in normal fashion to edit the segment (135) and presses and releases the cue index button at any time to return to the beginning of the current segment (136). When he finishes editing the current dictation recording segment, the dictator presses and holds the cue index button (137) until the recorder acknowledges completion of the segment by sounding two beeps (138). However, if the dictator does not desire to edit the first dictation recording segment (134), he presses and releases the cue index button to advance to the next segment in the dictation recording (139).

When the dictator uses the cue index button to advance to the next dictation recording segment (137 or 139), the recorder enhanced memory controller (29 in FIG. 2) determines if there is another segment in the current dictation recording (140). If another segment exists, the recorder audibly replays the respectively linked voice-prompt cue (141) and as before permits the dictator to decide whether to edit the segment (134). If no other segment exists in the dictation recording, the recorder sounds a one-second beep and displays a message accordingly (142). The dictator acknowledges completion by pressing and releasing the cue index button (143). The recorder display then returns to the voice-prompt primary-modes menu (144) in order to again display the primary-modes selection options (35 in FIG. 3-A).

Detailed Description: Operation Summary—FIGS. 3-A to 3-I

Though the above description of operation assumes a personal hand-held digital dictation recorder, it is applicable to other typical embodiments of this invention. Other typical embodiments include personal desktop-style dictation recorders, personal-computer-based digital dictation systems, and centralized digital dictation systems. The level of detail provided should enable anyone skilled in the art to design and produce this invention in any of its typical embodiments.

CONCLUSION, RAMIFICATIONS, AND SCOPE

Accordingly, this invention in its simplest typical embodiment provides a dictator with a means to prerecord and save a personalized voice-prompting and dictation-indexing dictation template in the form of a corresponding set of voice-prompt cues. It also provides the dictator with a means to replay these prerecorded voice-prompt cues as an aid to later dictation in conformance with their corresponding template.

With this invention in its simplest typical embodiment, a dictator no longer has to depend upon her memory or upon written or printed outlines, lists, forms, or notes when dictating in conformance with predetermined standards or templates. Instead, this invention provides a means to audibly prompt the dictator with convenient and meaningful prerecorded voice-prompt cues for each successive corresponding template dictation segment.

This invention in a somewhat more elaborate typical embodiment further comprises a means to index and link each memory-stored voice-prompt cue to its corresponding recorded dictation session segment as a means to aid cuing, reviewing, and editing of the segment. This embodiment also comprises a means to include each dictation-indexing voice-prompt cue as the first integral part of its respectively recorded dictation segment. It therefore provides a means to overcome significant limitations of and improve upon conventional electronically recorded cue-and-review signals by automatically adding meaningful prerecorded voice-prompt cues to the beginning of each recorded dictation segment. These automatically embedded voice-prompt cues aid a dictator's cue and review of recorded dictation segments by eliminating the necessity to manually replay part of a cued segment in order to determine its content. Cuing a segment automatically causes the audible replay of the corresponding voice-prompt cue and thus meaningfully announces the segment's content.

Further still, this invention in a yet more elaborate embodiment comprises a means for a dictator to prerecord any number of voice-prompting dictation templates for multiple dictation applications. This more elaborate embodiment also comprises a means for the dictator to easily edit or replace either or all of these templates at any time to suit changing dictation needs. A still more elaborate embodiment comprises a means to store the multiple templates on multiple removable storage means. These more elaborate embodiments thus provide the dictator with a convenient means to have any number of readily available and easily modifiable voice-prompting templates to meet all her standardized dictation needs.

Although the description above contains many specificities, these should not be construed as limiting the scope of this invention but as merely providing illustrations of some of the presently preferred embodiments of this invention. For example, the single cue index button could be replaced by a two-push-button or three-push-button combination; the cue index button response and selection means could be replaced with a speech command and response recognition means; the recorder's beep responses and warnings could be replaced by digitized prerecorded voice responses with optional corresponding prerecorded accompanying instructions; the dictation memory could be conventional audio tape micro-cassettes; etc.

Thus the scope of the invention should be determined by the appended claims and their legal equivalents, rather than by the examples given.

I claim:

1. A personal hand-held dictation recorder comprising:
   (a) a means to separately and independently input multiple dictation-indexing voice-prompt dictation cues,
   (b) a means to separately and independently store said voice-prompt dictation cues,
   (c) a means to separately retrieve said stored voice-prompt dictation cues during any later dictation recording session, and
   (d) a means to audibly output said retrieved voice-prompt dictation cues during said later dictation recording session,
   whereby a dictator may prerecord and save a readily available and reusable personalized dictation template in the form of corresponding personally recorded voice-prompt dictation cues,
   whereby said dictator may during any later dictation recording session retrieve and audibly replay said personally recorded voice-prompt dictation cues as a means to dictation in concert with said cues, and
   whereby said replayed voice-prompt dictation cues may collectively serve to audibly prompt and thereby aid said dictator while dictating in conformance with a corresponding list, outline, instruction set, or standard form represented by said cues.

2. The dictation recorder in claim 1 wherein said dictation recorder is a personal hand-held digital dictation recorder of the type comprising digital voice-processing circuitry and digital memory.

3. The dictation recorder in claim 1, further including:
   (a) a means to digitally process each of said separately and independently input multiple dictation-indexing voice-prompt dictation cues,
   (b) means to digitally store each of said digitally processed voice-prompt dictation cues,
   (c) means to selectively edit, delete, or replace any or all of said separately and independently digitally processed and stored voice-prompt dictation cues,
   (d) a means to digitally index and link each of said stored voice-prompt dictation cues to a corresponding separately recorded and stored dictation segment during any said later dictation recording session,
   (e) a means to enable each of said digitally indexed and linked voice-prompt dictation cues to serve as an audible cuing index to its said corresponding separately recorded and stored dictation segment, and (f) a means to enable each of said digitally indexed and linked voice-prompt dictation cues to be included as the first integral part of its said corresponding separately recorded and stored dictation segment and thereby included as part and parcel of the total dictation recording session final recording, whereby said dictator may during any later dictation recording session selectively edit, delete, or replace any or all of said personally recorded voice-prompt dictation cues, whereby said dictator may during any later dictation session retrieve and audibly replay said personally recorded voice-prompt dictation cues as a means to dictation in concert with said cues, whereby each of said voice-prompt dictation cues is indexed and linked to its corresponding recorded and stored dictation session recorded segment, whereby said voice-prompt dictation cues may collectively serve to prompt and thereby aid said dictator while dictating in conformance with a corresponding list, outline, instruction set, or standard form represented by said cues, whereby said voice-prompt dictation cues serve as successive personally recorded audible voice indexes to their said corresponding separately recorded and stored dictation segments, whereby each of said voice-prompt dictation cues serves both as a personalized verbal cue to the beginning point and as a helpful reminder or index of the content of its said corresponding separately recorded and stored dictation segment during said dictator's normal dictation session cue and review process, whereby said dictator may optionally direct and enable each of said voice-prompt dictation cues to be included as part and parcel of the final total dictation recording, and whereby said voice-prompt dictation cues may be transcribed as paragraph or section titles or headers when said final dictation recording is later transcribed.

4. The dictation recorder in claim 3 wherein said voice-prompt dictation cues digital storage means is non-volatile digital memory, whereby said stored voice-prompt dictation cues will not be lost in case of battery or power failure.

5. The dictation recorder in claim 4 wherein said non-volatile memory voice-prompt dictation cues digital storage means is a removable flash memory card, whereby said dictator may optionally prerecord said voice-prompt dictation cues for multiple different said dictation templates or different versions of the same template on separate said flash memory cards.

6. The dictation recorder in claim 3 further including means to input, store, index, link, edit, retrieve, and output multiple independent sets of said digitally processed voice-prompt dictation cues in separate and independent areas of said voice-prompt dictation cues digital storage means, whereby said dictator may store multiple different said dictation templates for varied dictation situations, whereby the number of said templates stored is limited only by the total memory capacity of said storage means.

7. A method for separately and independently recording and storing and, during any later dictation session, retrieving and replaying multiple dictation-indexing voice-prompt dictation cues with a personal hand-held digital dictation recorder, comprising:

(a) an analog-to-digital conversion means to convert the microphone-input separate and independent analog signals of said voice-prompt dictation cues into digitized data, (b) a memory which is capable of storing and indexing said voice-prompt digitized data separately and independently from corresponding later dictation recording session digitized data, (c) a memory controller to:
  (1) direct said separate and independent storing and indexing of said voice-prompt digitized data in said memory,
  (2) direct said separate and independent storing and indexing of said corresponding later dictation recording session digitized data,
  (3) link said separately and independently stored and indexed voice-prompt digitized data to said corresponding later dictation recording session digitized data,
  (4) direct separate and independent retrieval from said memory of said stored and indexed voice-prompt digitized data,
  (5) direct combined retrieval of said stored and indexed voice-prompt digitized data and said linked corresponding dictation recording session digitized data, and
  (6) manage the update of said memory for all edits, deletions, replacements, and additions of said voice-prompt digitized data, (d) a digital-to-analog conversion means to convert said retrieved voice-prompt and corresponding dictation recording session digitized data back to analog signals, (e) a means to amplify and audibly output said analog signals, and (f) a selection and control means whereby a dictator may:
  (1) direct the separate and individual recording and storing of said voice-prompt dictation cues in said separate and independent memory,
  (2) direct the editing, replacing, or deleting of said separately and independently stored voice-prompt dictation cues, and
  (3) individually select the next or a specific said voice-prompt dictation cue and cause it to be independently converted by said digital-to-analog conversion means into said analog signal, amplified by said amplification means, and audibly replayed by said audible output means both during said voice-prompt recording and editing and during said dictation session recording, whereby a dictator may prerecord and save a readily available and reusable personalized dictation template in the form of corresponding personally recorded voice-prompt dictation cues, whereby said dictator may during any later dictation recording session retrieve and audibly replay said personally recorded voice-prompt dictation cues as a means to dictation in conformance with said cues, and whereby said personally recorded voice-prompt dictation cues may collectively serve to audibly prompt and thereby aid said dictator while dictating in conformance with a corresponding list, outline, instruction set, or standard form represented by said cues.

* * * * *